United States Patent [19]
Curatu

[11] Patent Number: 5,898,520
[45] Date of Patent: Apr. 27, 1999

[54] THREE-DIMENSIONAL IMAGING SYSTEM HAVING A POLARIZING FILTER

[75] Inventor: Eugene Curatu, Midland, Canada

[73] Assignee: Raytheon Company, Lexington, Mass.

[21] Appl. No.: 08/798,235

[22] Filed: Feb. 11, 1997

[51] Int. Cl.$^6$ .......................... G02B 27/26; G02F 1/1335; G03B 21/28
[52] U.S. Cl. .......................... 359/465; 359/247; 359/449; 349/15; 349/101; 353/8
[58] Field of Search .................................. 359/465, 464, 359/462, 247, 449; 348/57, 55, 58; 349/15, 96, 101; 353/8

[56] References Cited

U.S. PATENT DOCUMENTS

| | | | |
|---|---|---|---|
| 3,858,001 | 12/1974 | Bonne | 359/465 |
| 3,960,438 | 6/1976 | Bonne et al. | 349/96 |
| 4,281,341 | 7/1981 | Byatt | 359/465 |
| 4,719,507 | 1/1988 | Bos | 359/465 |
| 4,792,850 | 12/1988 | Liptoh et al. | 349/15 |
| 4,870,486 | 9/1989 | Nakagawa et al. | 349/15 |
| 4,877,307 | 10/1989 | Kalmanash | 359/465 |

FOREIGN PATENT DOCUMENTS

| | | | |
|---|---|---|---|
| 401220997 | 9/1989 | Japan | 359/465 |
| 408029728 | 2/1996 | Japan | 359/462 |
| 1523436 | 8/1978 | United Kingdom | 349/15 |

*Primary Examiner*—Jon Henry
*Attorney, Agent, or Firm*—W. C. Schubert; G. H. Lenzen, Jr.

[57] ABSTRACT

A three-dimensional stereovision imaging system (20) adapted for use with a polarizing filter (22). The inventive system (20) includes a stereovision projector (24) for generating a projection (26) of alternating left and right images. A polarizer (30) polarizes electromagnetic energy corresponding to the images (26) and provides a polarized image (34) in response thereto. A twist liquid crystal screen (28) controlled by a twist liquid crystal controller (36) rotates the plane of oscillation of the polarized image (40) by a first twist angle synchronized with the alternating left and right images. Polarizing glasses (42) direct the polarized image (40) from the twist liquid crystal (28) into alternate eyes in response to the polarization state of the polarized image (40). In a specific embodiment, the polarizing glasses (42) have first (44) and second (46) eye-pieces with first (44) and second (46) linear polarizers, respectively. The polarizing plane of the first polarizer (44) is rotated with respect to the polarizing plane of the second polarizer (46) by an angle equivalent to the twist angle which is ninety-degrees. In the illustrative embodiment, the sheet polarizer (30) includes a scattering screen (32) for reflective mode operation and a display for transmission mode operation.

4 Claims, 1 Drawing Sheet

THREE-DIMENSIONAL IMAGING SYSTEM HAVING A POLARIZING FILTER

BACKGROUND OF THE INVENTION

1. Field of Invention

This invention relates to imaging systems. Specifically, the present invention relates to three-dimensional imaging systems for use with passive polarizing glasses.

2. Description of the Related Art

Three-dimensional stereovision imaging systems are used in a variety of demanding applications ranging from aircraft head-up displays to virtual reality and TV and/or computer monitor applications. These applications require realistic images that appear three-dimensional.

Stereovision imaging systems typically include a display device for producing alternate left-eye, right-eye images. Each eye perceives a slightly different image adjusted for the difference in viewing angles between the left and right eyes. This enhances depth perception, making images appear more realistic.

A variety of imaging systems have been developed to enhance depth perception and image quality using stereovision principles. Several of these systems are described in a paper from 3DTV Corporation entitled "Stereoscopic Imaging Technology" by Michael Starks. The systems described in the above paper often require expensive control circuitry, expensive electrically controlled shutter glasses, and/or have unreliable moving parts.

A variety of successful systems and methods have been developed for encoding alternate left and right image data into video data streams. However, practical and cost-effective systems for directing the alternate image data into alternate eyes have been slow to develop. Existing systems typically work well only within a small range of viewing incident angles due to the nature of associated shutters, polarizer plates, display shapes, glasses and so on. To one standing to the side of such systems, images may appear non-three-dimensional.

Hence, a need exists in the art for cost-effective imaging system that can produce realistic three-dimensional images at a variety of incident angles.

SUMMARY OF THE INVENTION

The need in the art is addressed by the three-dimensional stereovision imaging system of the present invention. In the illustrative embodiment, the inventive system is adapted for use with a polarizing filter and includes an imaging subsystem for generating alternating left and right images. A linear polarizer near the image plane polarizes electromagnetic energy corresponding to the image plane and provides a polarized image in response thereto. An electrically addressed twist liquid crystal screen rotates the plane of oscillation of the polarized image by a first twist angle at predetermined times synchronized with the alternating left and right images. Polarizing glasses direct the polarized image from the twist liquid crystal into alternate eyes at the predetermined times in response to the polarization state of the polarized image.

In a specific embodiment, the polarizing glasses have first and second eye-pieces having first and second linear polarizers respectively. The polarizing plane of the first polarizer is rotated with respect to the polarizing plane of the second polarizer by an angle equivalent to the twist angle which is ninety-degrees.

In the illustrative embodiment, the polarizing filter includes a scattering screen for reflective mode operation, and a display for transmissive mode operation.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
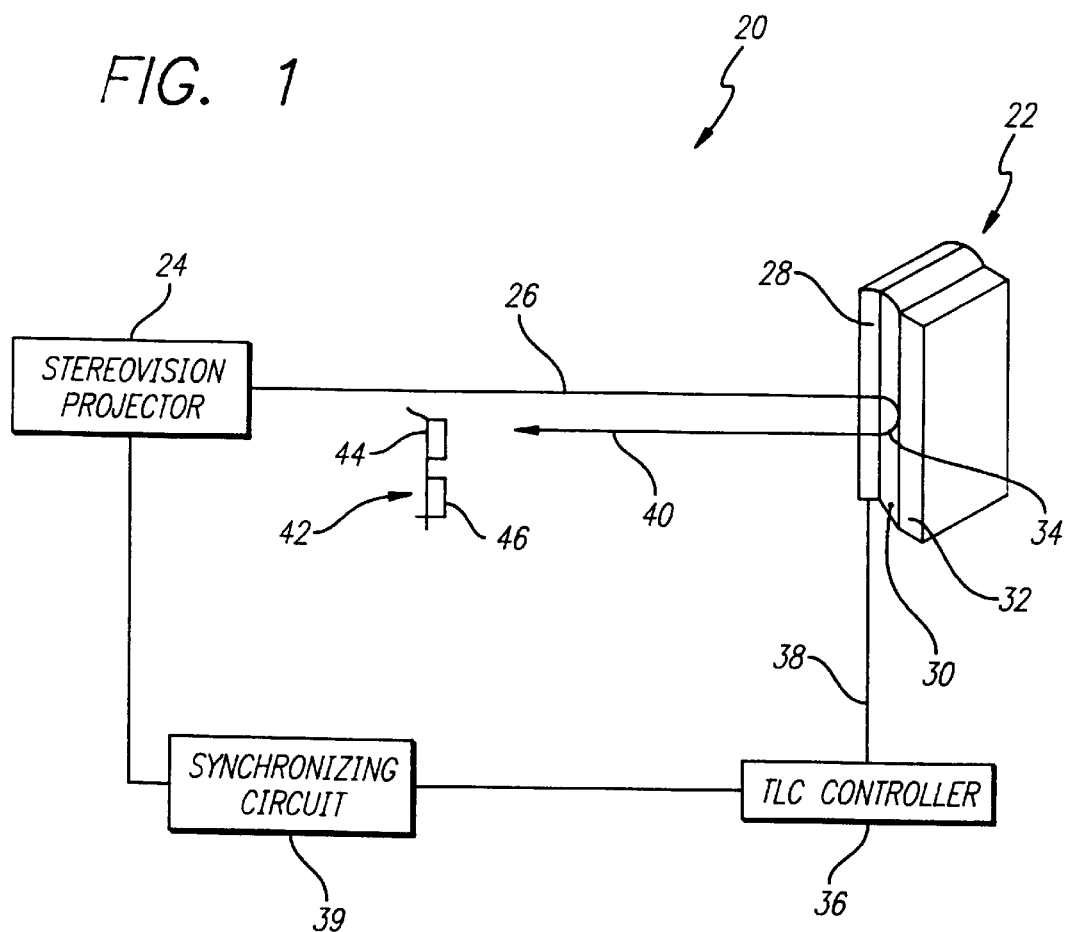
FIG. 1 is a diagram of a three-dimensional imaging system operating in reflecting mode, including a polarizing filter, and constructed in accordance with the teachings of the present invention.

FIG. 1 is a diagram of a three-dimensional imaging system 20 operating in reflecting mode, including a polarizing filter 22, and constructed in accordance with the teachings of the present invention. The imaging system 20 includes a conventional stereovision projector 24 that projects an unpolarized beam 26 of alternate left and right images. An inventive polarizing filter 22 is placed with respect to the projector 24 so that the beam 26 impinges on the filter 22 with a small angle of incidence. The polarizing filter 22 includes a twist liquid crystal (TLC) layer 28 adjacent to a polarizer sheet 30 that is in turn adjacent to a scattering screen 32. Twist liquid crystal material is known in the art.

The unpolarized stereo projection beam 26 passes through the TLC layer 28 unaffected by the state of the layer 28. The beam 26 then passes through the polarizer sheet 30 and reflects off the scattering screen 32 adjacent to the polarizer sheet 30 as a reflected beam 34. The reflected beam 34 is linearly polarized by the polarizer sheet 30 and has a first plane of oscillation (not shown). The reflected beam 34 passes through the TLC layer 28 where the plane of oscillation is selectively twisted by the TLC layer 28 resulting in an alternately polarized beam 40.

A twist liquid crystal controller 36 is connected to the TLC layer 28 via a bus 38 and controls the twisting of the plane of oscillation of the reflected beam 34 by the layer 28 by selectively activating the layer 28. The TLC controller 36 includes a synchronizing circuit 39 that synchronizes the twisting of the plane of oscillation of the beam 34 with the alternation of the left and right image data from the projector 24.

Several models of TLC controllers 36, including universal interfaces and stereoscopic computer software, have been marketed that may be used for synchronizing the polarizing filter 22 with alternate images. For example, the 3000 Stereo-Driver from 3DTV Corp. may be used for this purpose.

The twisting of the plane of oscillation of the reflected beam 34 is synchronized with the alternate left and right images in the incident beam 26. Image data in the image beam 34 is polarized so that it has the first plane of oscillation. The plane of oscillation of right image data in the alternately polarized beam 40 is twisted so that it has a second plane of oscillation. The left image data remains untwisted. In the present specific embodiment, the first plane of oscillation is angled with respect to the second plane of oscillation by ninety degrees and is parallel (p-polarization)

to plane of polarization (not shown) of the polarizer sheet 30. Right image data is twisted by the TLC layer 28 so that its plane of oscillation is perpendicular (s-polarization) to the plane of polarization of the polarizer sheet 30.

Those skilled in the art will appreciate that the planes of polarization of the left and right image data may be switched without departing from the scope of the present invention.

The alternately polarized beam 40 exits the TLC Layer 28 having p and s polarizations for left and right image data respectively. Image information in the alternately polarized beam 40 may be viewed with a pair of polarized glasses 42. The glasses have a p-polarized eye-piece 44 and a s-polarized eye-piece 46 that cover left and right eyes respectively. The s-polarized eye-piece 46 allows s-polarized light corresponding to right image data to pass through the eye-piece 46. Left image data is blocked by the s-polarized eye-piece 46. Similarly, the p-polarized eye-piece 44 allows left image data to pass through the eye-piece 44 and blocks right image data. Hence, left and right eyes receive left and right image data respectively regardless of the viewing angle.

The polarizing filter 22 has a multilayer configuration including a polarizing sheet and a single cell or multiple cells of Twisted-Nematic Liquid-Crystal such as may be obtained from Hughes Research Laboratories in Malibu, Calif. The single or multi-cell is placed over the scattering screen or monitor.

Figure 2:
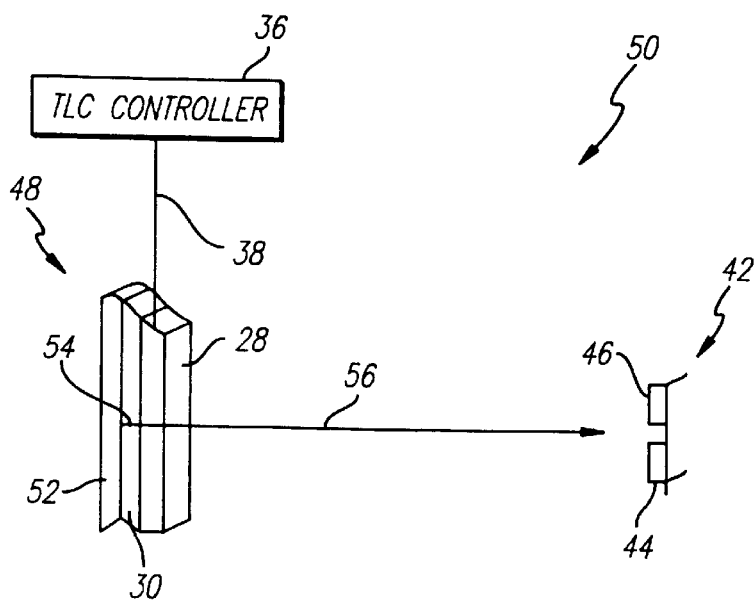
FIG. 2 is a diagram of an alternative embodiment of the present invention including a polarizing filter operating in transmitting mode.

FIG. 2 is a diagram of an alternative embodiment 50 of the present invention including a polarizing filter 48 operating in transmitting mode. The polarizing filter 48 of the system 50 includes a display device 52 for transmitting alternate left and right images 54 through the polarizer sheet 30 and the TLC layer 28. The alternate images 54 in the form of electromagnetic energy are linearly polarized by the polarizer sheet 30 before passing through the TLC layer 28. The operation of the TLC layer 28 in the transmitting system 50 is similar to the operation of the TLC layer 28 in the reflecting system 20 of FIG. 1. The TLC layer 28 selectively rotates the plane of oscillation of polarized electromagnetic energy corresponding to the images 54. The operation of the glasses 42 in the transmitting system 50 is also similar to the operation of the glasses 42 in the reflecting system 20 of FIG. 1. The glasses 42 direct a beam of alternately polarized images into alternate eyes via the alternately polarized eye-pieces 44, 46.

Several techniques have been proposed and marketed for recording and displaying sequential stereoscopic images. All standard NTSC and monitors or LCD projectors are compatible with tapes, discs, and CD-ROMS in the sequential format.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A polarizing filter adapted for use with a projector that projects stereoscopic image data comprising:

a reflective layer for reflecting said projected stereoscopic image data;

a polarization layer, disposed on said reflective layer, for polarizing said stereoscopic image data into a first polarization state; and an electrically controlled layer disposed on said polarization layer for selectively switching said first polarization state to a second polarization state in response to said control signal.

2. The invention of claim 1 wherein said polarization layer is a sheet of linearly polarizing material.

3. The invention of claim 2 wherein said electrically controlled layer is a twist liquid crystal layer.

4. The invention of claim 3 including a control circuit for providing a control signal in synchronism with a changeover of stereoscopic images in said stereoscopic image data, wherein said control circuit includes a twist liquid crystal controller and a synchronizing circuit.

* * * * *